(12) United States Patent
Frenzel et al.

(10) Patent No.: US 11,400,901 B2
(45) Date of Patent: Aug. 2, 2022

(54) METHOD FOR OPERATING A VEHICLE, VEHICLE

(71) Applicant: Robert Bosch GmbH, Stuttgart (DE)

(72) Inventors: Toni Frenzel, Yokohama-Yokohama (JP); Andreas Tost, Lauffen (DE); Franz Dahlke, Karlsruhe (DE); Friedrich Stelter, Weil der Stadt (DE); Dennis Frankenbach, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 309 days.

(21) Appl. No.: 16/419,724

(22) Filed: May 22, 2019

(65) Prior Publication Data

US 2019/0359190 A1    Nov. 28, 2019

(30) Foreign Application Priority Data

May 24, 2018 (DE) .......................... 102018208167.0

(51) Int. Cl.
*B60T 8/00* (2006.01)
*B60T 8/1755* (2006.01)
*B60G 17/0195* (2006.01)
*B60G 17/019* (2006.01)

(52) U.S. Cl.
CPC .......... *B60T 8/1755* (2013.01); *B60G 17/019* (2013.01); *B60G 17/0195* (2013.01); *B60G 2800/916* (2013.01)

(58) Field of Classification Search
None
See application file for complete search history.

(56) References Cited

U.S. PATENT DOCUMENTS

| 5,588,721 | A | * | 12/1996 | Asano | ................ | B60T 8/17636 |
|---|---|---|---|---|---|---|
| | | | | | | 303/163 |
| 2015/0284022 | A1 | * | 10/2015 | Kudo | .................... | B62D 6/008 |
| | | | | | | 701/41 |
| 2016/0084331 | A1 | * | 3/2016 | Merlo | .................... | F16D 69/00 |
| | | | | | | 188/1.11 E |
| 2016/0245351 | A1 | * | 8/2016 | Johnson | .................... | B60T 8/17 |
| 2017/0136842 | A1 | * | 5/2017 | Anderson | ............ | B60G 17/016 |

* cited by examiner

*Primary Examiner* — Truc M Do
(74) *Attorney, Agent, or Firm* — Norton Rose Fulbright US LLP; Gerard Messina

(57) ABSTRACT

A method for operating a vehicle, the vehicle including at least one friction brake unit, including a brake body and at least one brake element, the brake body being rotatably fixedly connected to a wheel of the vehicle and the brake element being situated on the chassis side and being displaceable in the direction of the brake body. The brake element is pressed against the brake body for generating a friction braking action, and an actual vehicle parameter resulting from the friction brake action being monitored for vibrations with the aid of at least one sensor unit. When detecting a vibration, the frequency of the vibrations is compared with the rotational speed of the wheel, and at least one safety measure is carried out in a third step if the comparison indicates that the frequency is equal to or greater than the rotational speed of the wheel.

20 Claims, 2 Drawing Sheets

METHOD FOR OPERATING A VEHICLE, VEHICLE

CROSS REFERENCE

The present application claims the benefit under 35 U.S.C. § 119 of German Patent Application No. DE 102018208167.0 filed on May 24, 2018, which is expressly incorporated herein by reference in its entirety.

FIELD

The present invention relates to a method for operating a vehicle, the vehicle including at least one friction brake unit, including a brake body and at least one brake element, the brake body being rotatably fixedly connected to a wheel of the vehicle and the brake element being situated on the chassis side and displaceable in the direction of the brake body, and the brake element being pressed against the brake body for generating a friction brake action and an actual vehicle parameter resulting from the friction brake action being monitored with the aid of at least one sensor unit.

The present invention further relates to a vehicle, including a control unit for carrying out the method.

BACKGROUND INFORMATION

Vehicles, in particular, motor vehicles are generally equipped with friction brake units, which generate friction brake actions, for example, when actuating a brake actuation element. The vehicles normally also include at least one sensor unit for monitoring an actual vehicle parameter resulting from the friction brake action, for example, a speed of the vehicle.

As a result of the electrification of drive trains, braking torques are increasingly achieved via a regenerative operation of electric drive motors of the vehicle for recovering energy. A major portion of the braking operations in road traffic is covered in this way.

Due to the resulting reduced load on the friction brake unit, however, corrosion and/or contaminations may increasingly appear in areas of friction surfaces of the brake body. Corrosion and/or contaminations of the brake bodies also affect vehicles that have no regeneratively operable electric motor, for example, if the vehicles are not moved or moved only little over a longer period of time. The friction coefficient acting between the brake element and a corroded and/or contaminated area of the brake body differs from the friction coefficient between the brake element and a non-corroded, uncontaminated area of the brake body, resulting in friction coefficient differences on the brake body. These local changes of the friction coefficient are not diagnosable in today's state of the art.

SUMMARY

An example method according to the present invention may have the advantage that friction coefficient differences on the brake body are recognized in an automated manner and upon recognition of friction coefficient differences, suitable safety measures are carried out. As a result, the safety during operation of the vehicle, in particular, is enhanced. For this purpose, it is provided according to the present invention that the brake element is pressed in a first step against the brake body for generating a friction brake action, and an actual vehicle parameter resulting from the friction brake action is monitored for vibrations with the aid of at least one sensor unit, that upon detection of a vibration, the frequency of the vibration is compared in a second step with the rotational speed of the wheel, and that at least one safety measure is carried out in a third step if the comparison indicates that the frequency of the vibration is equal to or greater than the rotational speed of the wheel. If an area of the friction surface of the brake body exhibits corrosions and/or a contamination, the brake element is pressed temporarily on the corroded and/or contaminated area of the friction surface and temporarily on the non-corroded, uncontaminated area during the breaking operation due to a rotation of the wheel. Due to the friction coefficient differences, a braking operation results, in particular, also during constant actuation of a brake actuation element, which exhibits a braking torque having a vibrating characteristic. As a result of the vibrating braking torque, various actual vehicle parameters resulting from the braking operation also exhibit a vibrating characteristic. The frequency of the vibration in this case is equal to or greater than the rotational speed of the wheel, because the corroded and/or contaminated area of the wheel passes the brake element with each rotation. Thus, corrosion and/or contaminations of brake bodies is/are recognizable based on vibrations of actual vehicle parameters.

An amplitude of the vibration is preferably monitored, the at least one safety measure being carried out as a function of the detected amplitude. This yields the advantage that different safety measures, preferably the best suited safety measure, are selected as a function of the amplitude. It is assumed that the amplitude correlates with the degree of corrosion and/or of the contamination, so that different safety measures are carried out as a function of the degree. It is provided, in particular, that the at least one safety measure is carried out only if an amplitude is detected, which is above a predefinable first threshold value.

According to one preferred specific embodiment of the present invention, it is provided that the sensor unit detects a pressure in a brake master cylinder as the actual vehicle parameter. The result of the vibrating characteristic of the braking torque is also a vibrating characteristic of the pressure in the brake master cylinder. This is reliably detectable and without design complexity, in particular, because corresponding pressure sensors are already components of many vehicles. Alternatively or in addition, the pressure is detected, in particular, with the aid of a pressure sensor at another point in the brake circuit, to which the friction brake unit is assigned.

The sensor unit preferably detects a displacement of a brake actuation element and/or a displacement of an input rod of an electric brake booster as the actual vehicle parameter or parameters. Because a vibrating displacement of the brake actuating element or of the input rod also results from the vibrating braking torque characteristic, this vibrating displacement may also be detected and evaluated by the sensor unit designed for this purpose.

According to one preferred specific embodiment of the present invention, it is provided that the sensor unit detects a steering angle of the vehicle as the actual vehicle parameter. This is advantageous, in particular, if sensors for detecting the steering angle are already present in the vehicle. A local friction coefficient change may repeatedly affect the steering angle, in particular, when the friction brake unit is assigned to a steerable wheel. This change of the steering angle is detectable and evaluable by the sensor unit.

The sensor unit preferably detects a rotational speed of the wheel and/or an acceleration of the vehicle as the actual vehicle parameter or parameters. The detection of the rotational speed is reliably possible without design complexity with the aid of a rotational speed sensor assigned to the wheel. Acceleration sensors already present, for example, acceleration sensors of airbag systems of the vehicle, in particular, are used for detecting the acceleration.

Multiple of the aforementioned actual vehicle parameters are preferably simultaneously monitored for vibrations. This yields the advantage that the vibrations are particularly reliably detected, in particular, also in the case of a malfunction of one of the sensors.

An internal combustion engine of the vehicle, a regeneratively operable electric motor of the vehicle and/or the friction brake unit may be activated for generating the braking torque as a function of a requested braking torque. This yields the advantage that various activations and, therefore, various braking operations, in particular, emergency braking operations, friction brake unit-preserving braking operations, as well as braking operations with the recovery of braking energy are implementable as a function of the requested braking torque. The internal combustion engine, the regeneratively operable electric motor and the friction brake unit may, in particular, be activated, each alone or in combination for generating the braking torque.

A total braking torque is preferably generated as a safety measure only by the friction brake unit. Thus, other devices designed to generate braking torques, in particular, the internal combustion engine and/or the regeneratively operable electric motor, are not activated as a safety measure. With the now reinforced activation of the friction brake unit, contaminations and/or corrosion of the brake body are/is reduced, in particular, removed.

According to one preferred specific embodiment of the present invention, the friction brake unit is activated as a safety measure in an automated manner for generating a conditioning friction braking torque, independently of a braking torque requested by a driver. This yields the advantage that contaminations and/or corrosion of the brake body are/is reduced even without a request for a braking torque by the driver.

The conditioning friction braking torque generated by the friction brake unit is preferably at least essentially compensated for by a suitable activation of the internal combustion engine and/or of an electric drive motor of the vehicle. This results in a reduction of the contamination and/or of the corrosion of the brake body particularly convenient for the driver. The internal combustion engine and/or the electric drive motor are activated, in particular, in such a way that a torque of the conditioning friction braking torque requested by the driver is achieved.

The friction brake unit for generating the conditioning friction braking torque is preferably activated as a function of a temperature of the brake body. In particular, the friction brake unit is activated in such a way that when activating the friction brake unit for generating the conditioning friction braking torque, the brake body is not heated above a predefinable threshold value. This ensures an advantageous availability of the friction brake, for example, for an emergency braking, even during the generation of the conditioning friction braking torque.

An, in particular, acoustic and/or visual warning signal is/are preferably generated as a safety measure or safety measures. This is advantageous, because the driver is informed of the friction coefficient change. The warning signal includes, in particular, a recommendation for the driver to suitably adapt his/her driving behavior and/or to carry out a servicing of the friction brake unit.

According to one preferred specific embodiment of the present invention, it is provided that in a fourth step, the safety measure is terminated when an amplitude is detected, which is below a predefinable second threshold value, when a predefinable number of friction braking operations is achieved, which have been carried out after initiation of the safety measure, and/or when achieving a predefinable total braking energy, which has been generated by the friction brake unit after initiation of the safety measure. This yields the advantage that the safety measure, if unnecessary, is no longer carried out. For this purpose, the predefinable number of friction braking operations is selected, in particular, in such a way that after achieving the number, a reduction, in particular, a removal, of the corrosion and/or contamination has been achieved. The total braking energy is also selected, in particular, in such a way that after achieving the total energy, a reduction, in particular, a removal of the corrosion and/or contamination has been achieved. It is preferably provided that the safety measure is terminated only after achieving a combination of at least two of the aforementioned parameters, i.e., of the amplitude that is below the predefinable second threshold value, of the predefinable number of friction braking operations and/or of the predefinable total braking energy.

According to another specific embodiment of the present invention, it is provided that the at least one safety measure, in particular, the activation of the friction brake unit for generating a conditioning friction braking torque is carried out regularly as a function of a number of braking operations with the regeneratively operable electric motor, of an operating life of the vehicle, of an ambient temperature, of an atmospheric humidity of the vehicle and/or of a location of the vehicle. This takes place, in particular, independently of the detection of a vibration, the frequency of which is equal to or greater than the rotational speed of the wheel.

An example vehicle according to the present invention has at least one friction brake unit that includes a brake body and at least one brake element, the brake body being rotatably fixedly connected to a wheel of the vehicle and the brake element being situated on the chassis side and displaceable in the direction of the brake body, by a sensor unit for detecting an actual vehicle parameter from a friction brake action with the friction brake unit, and by a specifically prepared control unit which, when properly used, is configured to carry out the example method of the present invention. This yields the previously cited advantages.

BRIEF DESCRIPTION OF THE DRAWINGS

The present invention is explained in greater detail below with reference to the figures.

BRIEF DESCRIPTION OF THE DRAWINGS

Figure 1:
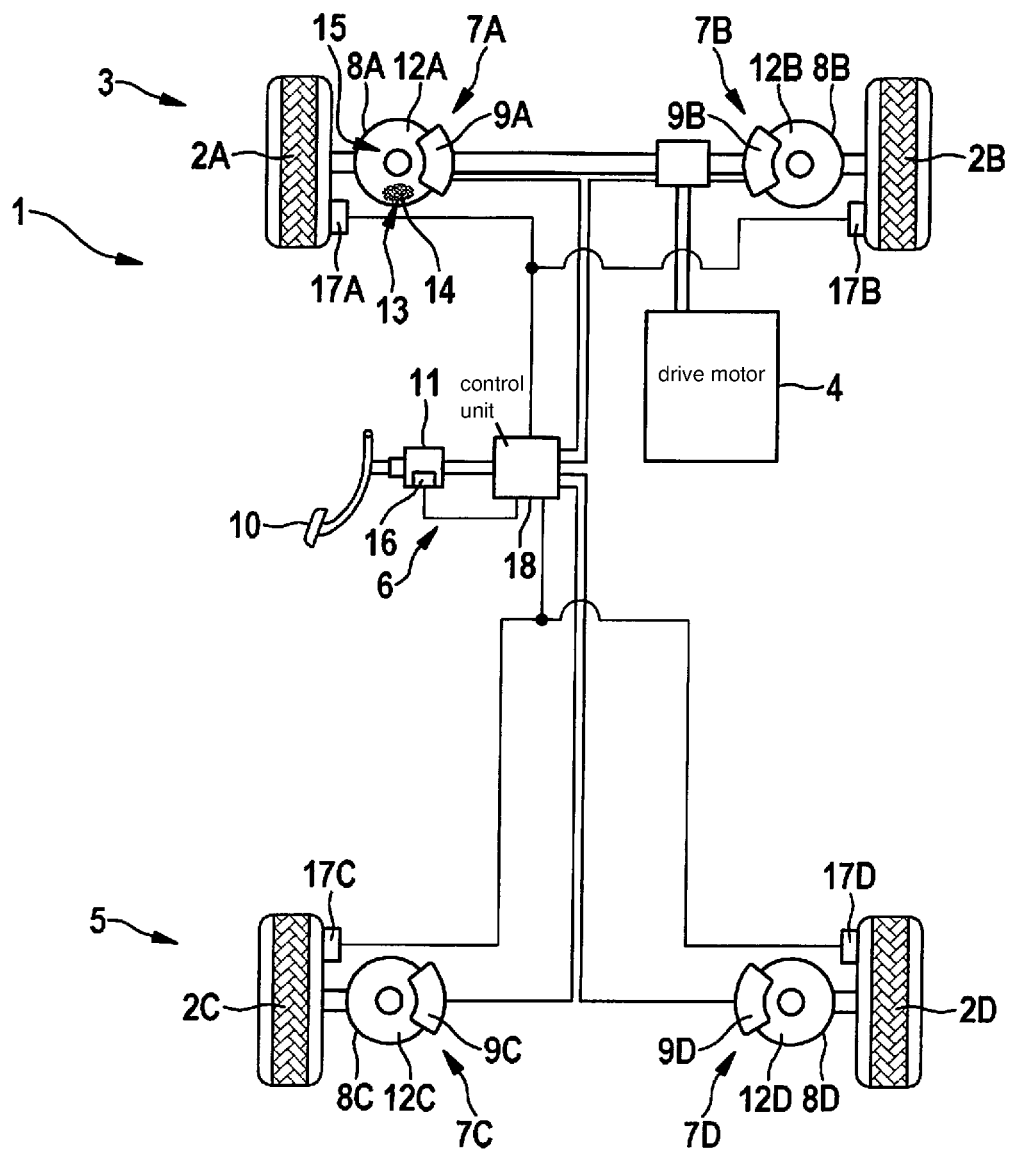
Figure 2:
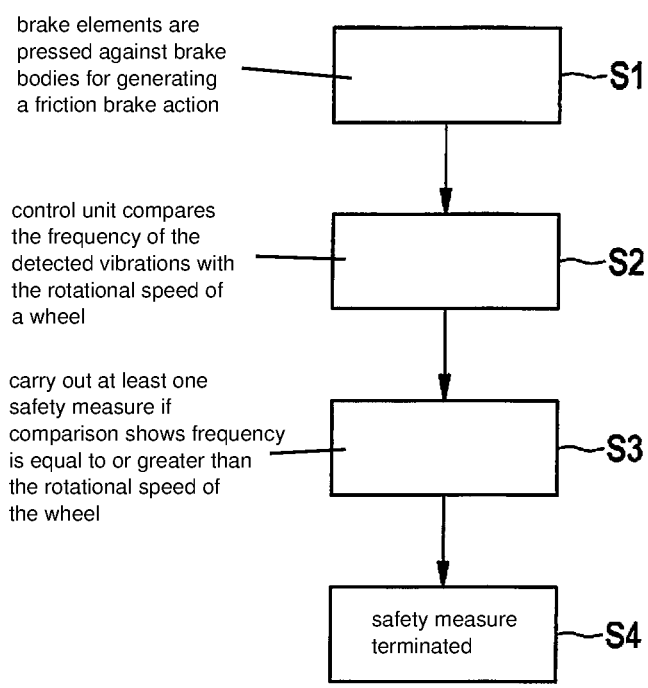

FIG. 1 shows a vehicle in a simplified top view.
FIG. 2 shows a method for operating the vehicle.

DETAILED DESCRIPTION OF EXAMPLE EMBODIMENTS

FIG. 1 shows a simplified representation of a top view of a vehicle 1. Vehicle 1 in the present case includes four wheels 2A, 2B, 2C and 2D (wheels 2), wheels 2A and 2B being assigned to a front wheel axle 3 of vehicle 1 and being drivable by a drive motor 4 of vehicle 1, in the present case a regeneratively operable electric drive motor.

Alternatively or in addition, vehicle 1 includes an internal combustion engine as a drive motor 4. According to another exemplary embodiment, wheels 2C and 2D of a rear wheel axle 5 are also drivable by drive motor 4. Wheels 2, in particular, are each individually drivable by drive motor 4.

Vehicle 1 depicted in FIG. 1 also includes a braking system 6, including friction brake units 7A, 7B, 7C and 7D (friction brake units 7), friction brake units 7 each being assigned to one of wheels 2. Friction brake units 7 each include a brake body 8A, 8B, 8C and 8D (brake bodies 8), which is rotatably fixedly connected to wheel 2 and in the present case is designed as a brake disk. Wheel brake units 7 also each include a brake element 9A, 9B, 9C and 9D (brake elements 9), which is situated on the chassis side and is displaceable in the direction of brake body 8. Braking system 6 further includes a brake actuation element 10, via the actuation of which a driver of vehicle 1 may request a braking torque. By actuating brake actuation element 10, a pressure increases in a brake master cylinder 11 of braking system 6. Brake master cylinder 11 is fluidically connected to wheel brake cylinders not depicted of friction brake units 7 in such a way that with a rise of the pressure in brake master cylinder 11, brake elements 9 are pressed against brake bodies 8 for generating a friction braking torque.

According to the exemplary embodiment depicted in FIG. 1, a friction surface 12A of friction brake unit 7A exhibits corrosion 14 in an area 13. During a friction braking operation with friction brake unit 7A, brake element 9A is temporarily pressed onto corroded area 13 and temporarily onto a non-corroded area 15 of friction surface 12A due to the rotation of the wheel 2A, a friction coefficient between brake element 9A and corroded area 13 differing from a friction coefficient between brake element 9A and non-corroded area 15. Thus, even when brake actuation element 10 is constantly actuated, the result is a vibrating characteristic of a generated braking torque due to the friction coefficient differences and the rotation of wheel 2A. The frequency of the vibration in this case is equal to or greater than the rotational speed of wheel 2A.

The vibration is also transferred to various actual vehicle parameters of vehicle 1, which result from the braking operation and may be detected with the aid of sensor units 16, 17. The sensor units in the present case include a pressure sensor 16 assigned to brake master cylinder 11 and rotational speed sensors 17 assigned to wheels 2.

Alternatively or in addition, sensor units are present for detecting a steering angle, a pedal travel and/or an acceleration.

Sensor units 16, 17 depicted in FIG. 1 are connected to a control unit 18 of vehicle 1. Control unit 18 is designed to compare at least the frequency of the vibrations with the rotational speed and to carry out at least one safety measure if the comparison indicates that the frequency is equal to or greater than the rotational speed of wheel 2.

FIG. 2 shows with reference to a flow chart an advantageous method for operating vehicle 1. In a first step S1, brake elements 9 are pressed against brake bodies 8 for generating a friction brake action. During the friction brake action, a first actual vehicle parameter resulting from the friction brake action is monitored for vibrations with the aid of sensor units 16, 17. Sensor units 16, 17 in the present case are designed to detect a hydraulic pressure in brake master cylinder 11 and a rotational speed of wheels 2. Alternatively or in addition, sensor units are used, which are designed to detect a displacement of brake actuating element 10, a displacement of an input rod of an electric brake booster, a steering angle of vehicle 1 and/or an acceleration of vehicle 1 as the actual vehicle parameter or parameters.

In a second step S2, control unit 18 connected to sensor units 16, 17 compares the frequency of the detected vibrations with the rotational speed of wheel 2. As previously discussed, a vibration of an actual vehicle parameter resulting from corrosions and/or contamination of brake body 8 has a frequency, which is equal to or greater than the rotational speed of wheel 2. Vibrations whose frequency is lower than the rotational speed of the wheel do not result from corrosion and/or contaminations of brake body 8.

In a third step S3, at least one safety measure is carried out if the comparison shows that the frequency is equal to or greater than the rotational speed of the wheel. Various safety measures are possible in this case, preferably the generation of an, in particular, visual and/or acoustic warning signal, and/or an automated activation of friction brake units 7, so that friction brake units 7 generate a conditioning friction braking torque, i.e., a friction braking torque, via which the contamination and/or the corrosion of brake body 8 is/are at least essentially removed. It is preferably provided that a requested braking torque is generated as a safety measure only by friction brake unit 7. Regeneratively operable electric drive motor 4 and/or the optionally present internal combustion engine, in particular, is/are not activated for generating a braking torque.

In a fourth step S4, the safety measure is terminated. This takes place when an end parameter is achieved. In this case, the end parameter is the detection of an amplitude that is below a predefinable second threshold value, the achievement of a predefinable number of friction braking operations or the achievement of a predefinable total braking energy that has been generated by the friction brake unit after initiation of the safety measures. Alternatively, the at least one safety measure is terminated only upon achieving a combination of multiple of the aforementioned parameters.

What is claimed is:

1. A method for operating a vehicle, the vehicle including at least one friction brake unit which includes a brake body and at least one brake element, the brake body being rotatably fixedly connected to a wheel of the vehicle and the brake element being situated on a chassis side of the vehicle and being displaceable in a direction of the brake body, the method comprising:
   pressing the brake element against the brake body rotatably fixedly connected to the wheel of the vehicle to generate a friction brake action, and monitoring an actual vehicle parameter for vibrations resulting from the friction brake action using at least one sensor unit of the vehicle;
   detecting a rotational speed of the wheel using the at least one sensor unit;
   when detecting a vibration resulting from the friction brake action, comparing a frequency of the detected vibration with the detected rotational speed of the wheel;
   detecting corrosion of or contamination of the brake body based on the comparison indicating that the frequency of the detected vibration is equal to or greater than the detected rotational speed of the wheel; and
   carrying out at least one safety measure when the comparison indicates that the frequency of the detected vibration is equal to or greater than the detected rotational speed of the wheel and based on detecting the corrosion of or the contamination of the brake body.

2. The method as recited in claim 1, wherein the monitoring includes monitoring an amplitude of the vibration, the at least one safety measure being carried out as a function of the detected amplitude.

3. The method as recited in claim 1, wherein the sensor unit detects a pressure in a brake master cylinder as the actual vehicle parameter.

4. The method as recited in claim 1, wherein the sensor unit detects a displacement of a brake actuation element and/or a displacement of an input rod of an electric brake booster as the actual vehicle parameter.

5. The method as recited in claim 1, wherein the sensor unit detects a steering angle of the vehicle as the actual vehicle parameter.

6. The method as recited in claim 1, wherein the sensor unit detects a rotational speed of the wheel and/or an acceleration of the vehicle as the actual vehicle parameter or parameters.

7. The method as recited in claim 1, wherein an internal combustion engine of the vehicle, and/or a regeneratively operable electric motor of the vehicle, and/or the friction brake unit, is activated for generating a braking torque.

8. The method as recited in claim 1, wherein, as a safety measure of the at least one safety measure, a total braking torque is generated only by the friction brake unit.

9. The method as recited in claim 1, wherein, as a safety measure of the at least one safety measure, the friction brake unit is activated in an automated manner for generating a conditioning friction braking torque independently of a braking torque requested by a driver.

10. The method as recited in claim 9, wherein the friction braking torque generated by the friction brake unit is compensated for by an activation of the internal combustion engine of the vehicle and/or of an electric drive motor of the vehicle.

11. The method as recited in claim 9, wherein the friction brake unit is activated for generating a conditioning friction braking torque as a function of a temperature of the brake body.

12. The method as recited in claim 1, wherein, as a safety measure of the at least one safety measure, an acoustic warning signal and/or a visual warning signal is generated.

13. The method as recited in claim 1, wherein the safety measure is terminated: (i) when an amplitude is detected that is below a predefinable second threshold value, and/or (ii) when a predefinable number of friction braking operations is achieved, which have been carried out after initiation of the safety measure, and/or (iii) when a predefinable total braking energy is achieved, which has been generated by the friction brake unit after the initiation of the safety measure.

14. A vehicle that includes at least one friction brake unit, the at least one friction brake unit including a brake body and at least one brake element, the brake body being rotatably fixedly connected to a wheel of the vehicle and the brake element being situated on a chassis side of the vehicle and being displaceable in the direction of the brake body, the vehicle further including a sensor unit configured to detect an actual vehicle parameter resulting from a friction brake action with the friction brake unit, a rotational speed sensor configured to detect a rotational speed of the wheel, and a specifically prepared control unit configured to actuate a pressing of the brake element against the brake body rotatably fixedly connected to the wheel to generate a friction brake action, monitor an actual vehicle parameter for vibrations resulting from the friction brake action using the sensor unit, detect the rotational speed of the wheel using the rotational speed sensor, and when detecting a vibration resulting from the friction brake action, compare a frequency of the detected vibration with the detected rotational speed of the wheel, detect corrosion of or contamination of the brake body based on the comparison indicating that the frequency of the detected vibration is equal to or greater than the detected rotational speed of the wheel, and carrying out at least one safety measure when the comparison indicates that the frequency of the detected vibration is equal to or greater than the detected rotational speed of the wheel and based on detecting the corrosion of or the contamination of the brake body.

15. The method as recited in claim 1, wherein the detecting of the rotational speed of the wheel using the at least one sensor unit occurs during the pressing of the brake element against the brake body.

16. The vehicle as recited in claim 14, wherein the detection of the rotational speed of the wheel is during the pressing of the brake element against the brake body.

17. The method as recited in claim 1, wherein, as a safety measure of the at least one safety measure, at least reducing the corrosion of and/or the contamination of the brake body by automatically performing a number of friction braking operations using the friction brake unit, independently of a braking torque requested by a driver of the vehicle.

18. The vehicle as recited in claim 14, wherein, as a safety measure of the at least one safety measure, the control unit is configured to at least reduce the corrosion of and/or the contamination of the brake body by automatically performing a number of friction braking operations using the friction brake unit, independently of a braking torque requested by a driver of the vehicle.

19. The method as recited in claim 1, wherein, as a safety measure of the at least one safety measure, removing from the brake body the corrosion of and/or the contamination of the brake body by automatically performing a number of friction braking operations using the friction brake unit, independently of a braking torque requested by a driver of the vehicle.

20. The vehicle as recited in claim 14, wherein, as a safety measure of the at least one safety measure, the control unit is configured to remove from the brake body the corrosion of and/or the contamination of the brake body by automatically performing a number of friction braking operations using the friction brake unit, independently of a braking torque requested by a driver of the vehicle.

* * * * *